(12) United States Patent
Chen et al.

(10) Patent No.: US 11,106,086 B2
(45) Date of Patent: Aug. 31, 2021

(54) OPTICAL PLATE WITH PROTRUSIONS, OPTICAL STRUCTURE, BACKLIGHT MODULE AND DISPLAY DEVICE

(71) Applicant: CHIMEI CORPORATION, Tainan (TW)

(72) Inventors: Hsin-Hung Chen, Tainan (TW); Wei-Chan Tseng, Tainan (TW); Chung-Hao Wang, Tainan (TW)

(73) Assignee: CHIMEI CORPORATION, Tainan (TW)

( * ) Notice: Subject to any disclaimer, the term of this patent is extended or adjusted under 35 U.S.C. 154(b) by 0 days.

(21) Appl. No.: 16/387,658

(22) Filed: Apr. 18, 2019

(65) Prior Publication Data
US 2019/0324328 A1  Oct. 24, 2019

(30) Foreign Application Priority Data

Apr. 20, 2018  (TW) .................................. 107113623
Apr. 16, 2019  (TW) .................................. 108113230

(51) Int. Cl.
G02B 5/02 (2006.01)
G02F 1/1335 (2006.01)
G02F 1/13357 (2006.01)

(52) U.S. Cl.
CPC ...... *G02F 1/133611* (2013.01); *G02B 5/0215* (2013.01); *G02B 5/0242* (2013.01);
(Continued)

(58) Field of Classification Search
CPC ......... G02F 1/133611; G02F 1/133603; G02F 1/133606; G02F 1/133607; G02B 5/0215;
(Continued)

(56) References Cited

U.S. PATENT DOCUMENTS 5,919,551 A * 7/1999 Cobb, Jr. ................. G02B 5/00
  359/530
6,752,505 B2 * 6/2004 Parker ................... A61M 21/02
  362/330

(Continued)

FOREIGN PATENT DOCUMENTS

CN  1952701 A  4/2007
CN  105891919 A  8/2016
(Continued)

OTHER PUBLICATIONS

TW Office Action dated Dec. 30, 2019 in Taiwan application (No. 108113230).

(Continued)

*Primary Examiner* — Arman B Fallahkhair
(74) *Attorney, Agent, or Firm* — McClure, Qualey & Rodack, LLP

(57) ABSTRACT

An optical plate with protrusions, an optical structure, a backlight module and a display device are provided. The optical plate includes a main body and several protrusions. The main body has a first surface. The protrusions are formed on and projected from the first surface. An area ratio of the protrusions to the first surface is in a range of 0.03~35%. The protrusions have a pitch in a range of 0.5~10 mm, and a portion of the first surface other than the protrusions has a first center line mean roughness Ra in a range of 0.01~0.1 μm.

19 Claims, 14 Drawing Sheets

(52) U.S. Cl.
CPC ......... G02B 5/0268 (2013.01); G02B 5/0278 (2013.01); G02F 1/133603 (2013.01); G02F 1/133606 (2013.01); G02F 1/133607 (2021.01)

(58) Field of Classification Search
CPC ... G02B 5/0242; G02B 5/0268; G02B 5/0278
See application file for complete search history.

(56) References Cited

U.S. PATENT DOCUMENTS

| | | | | |
|---|---|---|---|---|
| 7,448,775 | B2* | 11/2008 | Parker | G02B 6/0036 362/331 |
| 7,455,425 | B2 | 11/2008 | Inoue et al. | |
| 7,637,640 | B2* | 12/2009 | Chang | G02B 5/045 349/64 |
| 8,651,720 | B2* | 2/2014 | Sherman | G02B 5/12 362/560 |
| 8,733,970 | B2* | 5/2014 | Kim | G02B 6/0051 349/62 |
| 9,086,535 | B2* | 7/2015 | Sherman | G02B 5/128 |
| 9,341,754 | B2* | 5/2016 | Maekawa | G02B 5/0278 |
| 10,527,785 | B2* | 1/2020 | Tarsa | F21S 6/005 |
| 2007/0164274 | A1 | 7/2007 | Chen | |
| 2009/0080220 | A1* | 3/2009 | Chang | G02B 5/124 362/620 |
| 2009/0268430 | A1* | 10/2009 | Suzuki | G02B 5/0231 362/97.1 |
| 2012/0242930 | A1* | 9/2012 | Ryu | G02B 6/0076 349/62 |
| 2013/0070478 | A1* | 3/2013 | Edamitsu | G02B 5/0231 362/608 |
| 2014/0211503 | A1* | 7/2014 | Tarsa | G02B 6/0036 362/608 |
| 2017/0123262 | A1* | 5/2017 | Lee | G02B 6/0055 |

FOREIGN PATENT DOCUMENTS

| | | |
|---|---|---|
| CN | 106959476 A | 7/2017 |
| JP | H117014 A | 1/1999 |
| JP | H1114986 A | 1/1999 |
| JP | 200152519 A | 2/2001 |
| JP | 201032868 A | 2/2010 |
| JP | 6195881 | 9/2017 |
| JP | 6195882 | 9/2017 |
| KR | 1020160101637 A | 8/2016 |
| TW | 200424472 A | 11/2004 |
| TW | 200718995 A | 5/2007 |
| TW | 200728832 A | 8/2007 |

OTHER PUBLICATIONS

JP Office Action dated May 12, 2020 in Japanese application (No. 2019-080396).
KR Office Action dated Jul. 17, 2020 in Korean application (No. 10-2019-0046546).
Chinese Language Office Action dated Jul. 21, 2021 in Corresponding China Application No. 201910305606.9.

* cited by examiner

OPTICAL PLATE WITH PROTRUSIONS, OPTICAL STRUCTURE, BACKLIGHT MODULE AND DISPLAY DEVICE

This application claims the benefit of Taiwan application Serial No. 107113623, filed Apr. 20, 2018 and Taiwan application Serial No. 108113230, filed Apr. 16, 2019, the subject matters of which are incorporated herein by reference.

BACKGROUND

Field of the Invention

The disclosure relates in general to an optical plate, an optical structure, a backlight module and a display device, and more particularly to an optical plate, which has protrusions and can be used as a diffuser plate.

Description of the Related Art

Diffuser plate is an optical plate applied in the electronic products such as displays, which diffuses the light coming from a light source and achieves uniform brightness on the screen. The diffuser plates having different light transmittances are fabricated by the diffuser plate manufactures to meet the different requirements of the images presented on the electronic products. For example, an edge-lighting backlight module of a display (ex: LCD) generally comprise a light guide plate made of a light transmissive material, a light source (such as a linear light source consisting of the cathode Fluorescent Lights (CCFLs)) disposed at a lateral side of the light guide plate, a reflective film positioned below the light guide plate and the linear light source, and several light diffusers (films or plates) and/or lens film disposed on the light guide plate for forming a light emitting surface.

In recent years, to increase the luminance and decrease the power consumption of a color liquid crystal display (color LCD), one or two prism sheets would be disposed on the diffuser plate or between the diffuser plate and the light guide plate to condense the light from the light guide plate and enhance the brightness of the front surface of the LCD panel. Also, to improve the luminance uniformity affected by the different distances from the light source, a known technique of printing a dot pattern, comprising plural dots having sequentially increasing areas with the distances away from the light source, onto the light guide plate has been disclosed. However, the diffuser plate above the light guide plate should diffuse the light uniformly and make the dot pattern onto the light guide plate invisible. Furthermore, the prism sheets can be fabricated by producing decorative laminate on a thermoplastic resin plate or processing a radiation curable resin by a prism mold. However, the production cost of those prism sheets is very high, and it is considered to be the major reason that the backlight module is expansive. Additionally, the range of material selection for making the known prism sheets is limited to the manufacturing methods. Also, the prism sheet with no function of light diffusion has to be incorporated with the light diffuser (film or plate), thereby raising the issue of complicated assembly.

Besides the optical films such as the diffusion films, the prism sheets and the luminance-enhancing films used on the diffuser plate as described above for improving the luminance and the luminance uniformity of the display, an optical plate incorporating several functions, such as incorporating the light diffusion effect of the diffuser plate and the light condensation effect of the brightness enhancement film (BEF), has been researched and developed to achieve the objectives of light and thin appearance and low production cost of the display. Also, consumers continue to trade up to larger screen sizes of the display (such as the LCD TV), it is more desirable to develop an optical diffuser plate, which can not only reduce the number of the optical films but also improve the luminance and diffusion properties.

SUMMARY

The present disclosure relates to an optical plate with designed protrusions, which can be applied as a diffuser plate for increasing the luminance uniformity.

According to one embodiment of the present disclosure, an optical plate including a main body and several protrusions is provided. The main body has a first surface. The protrusions are formed on and projected from the first surface. An area ratio of the protrusions to the first surface is in a range of 0.03~35%. The protrusions have a pitch in a range of 0.5~10 mm, and a portion of the first surface other than the protrusions has a first center line mean roughness Ra in a range of 0.01~0.1 μm.

According to another embodiment of the present disclosure, an optical structure including an optical plate, an optical film, and an adhesive layer is provided. The optical plate is disclosed in an embodiment of the present disclosure. The optical film is disposed above the first surface of the main body. The adhesive layer is interposed between the optical plate and the optical film and adheres to the top surface of the protrusions. An air layer is formed between the first surface and the adhesive layer.

According to another embodiment of the present disclosure, an optical structure including an optical plate, an optical film and an adhesive layer is provided. The optical plate includes a main body and a plurality of protrusions. The main body has a first surface. The protrusions are projected from the first surface, wherein one of the protrusions has an outer diameter in a range of 200~500 μm and a maximum height (Hp) in a range of 10~35 μm, two adjacent protrusions have a pitch in a range of 0.5~10 mm. The optical film is disposed above the first surface of the main body. The adhesive layer is interposed between the optical plate and the optical film, wherein the adhesive layer adheres to the top surface of the protrusions, and an air layer is formed between the first surface and the adhesive layer.

According to another embodiment of the present disclosure, a backlight module including a light source and the optical structure disclosed above is provided. A second surface opposite to the first surface of the optical plate is disposed opposite to the light source.

According to another embodiment of the present disclosure, a backlight module including a light source and the optical plate disclosed above is provided. The first surface of the optical plate is opposite to the light source.

According to an alternate embodiment of the present disclosure, a display device is provided. The display device includes a backlight module including the optical plate or optical structure disclosed in an embodiment of the present disclosure. The display device is selected from a group composed of television (TV), notebook computer, mobile computer, and computer monitor.

The present invention will become apparent from the following detailed description of the preferred but non-

DETAILED DESCRIPTION

Figure 1:
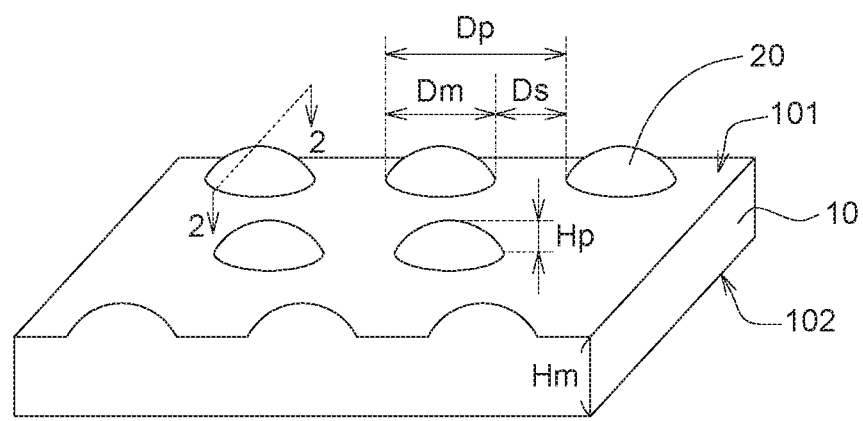
FIG. 1 is a schematic diagram of a part of an optical plate according to an embodiment of the present disclosure.

According to an embodiment of the present disclosure, an optical plate used as a diffuser plate in the backlight module of a display device is provided. Forming several protrusions on the main body surface and reducing surface roughness is used to increase the uniformity of luminance (such as average luminance uniformity of four corners (%)) in the light emitting area of the display device. According to the optical plate of the present disclosure, a diffuser plate with high diffusion performance can be provided, fewer functional films are needed, the cost can be reduced, and the display device using the optical plate can be thinned and light-weighted (particularly suitable for the large-sized display device). When the optical plate of the present disclosure is used as a diffuser plate, in one embodiment, the main body surface (that is, the first surface) on which the protrusions are formed can face the light source of the backlight module; and in the other embodiment, the rear surface (that is, the second surface) of the main body being the rougher surface can face the light source of the backlight module.

Embodiments are provided hereinafter with reference to the accompanying drawings for describing the related structures and configurations. However, the present invention is not limited thereto. The identical and/or similar elements of the embodiments are designated with the same and/or similar reference numerals. It is noted that not all embodiments of the invention are shown. Modifications and variations can be made without departing from the spirit of the invention to meet the requirements of the practical applications. There may be other embodiments of the present invention which are not specifically illustrated but applicable. It is also important to point out that the illustrations may not be necessarily to be drawn to scale. Thus, the specification and the drawings are to be regard as an illustrative sense rather than a restrictive sense.

Moreover, ordinal numbers, such as "the first", "the second", and "the third", are used in the specification and claims to modify the components of the claims. The ordinal numbers of claim components do not imply or represent that the said components have any previous ordinal numbers, nor represent the sequence between one and another claim component or the sequence of process in a manufacturing method. The ordinal numbers are used to clearly distinguish the claim components having the same designations. Furthermore, the specification and claims may use spatial relevant terminologies, such as "beneath", "below", "lower", "above", "upper" or similar terminologies, to describe the spatial relationship between one of the elements or features illustrated in the diagrams and another element or feature. In anyone ordinarily skilled in the technology field of the present disclosure will understand that these spatial relevant terminologies not only include element direction but further include the direction of the element used or operated in different diagrams. Thus, these terminologies used in the specification and claims are for describing the embodiments, not for limiting the scope of protection of the present disclosure.

Figure 2A:
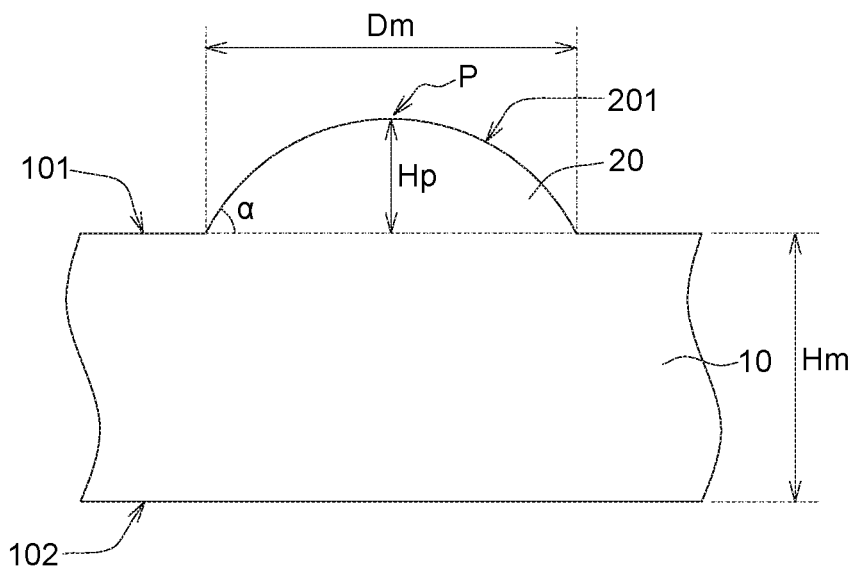
FIG. 2A is a cross-sectional view of a protrusion along a cross-sectional line 2-2 of FIG. 1.
Figure 2B:
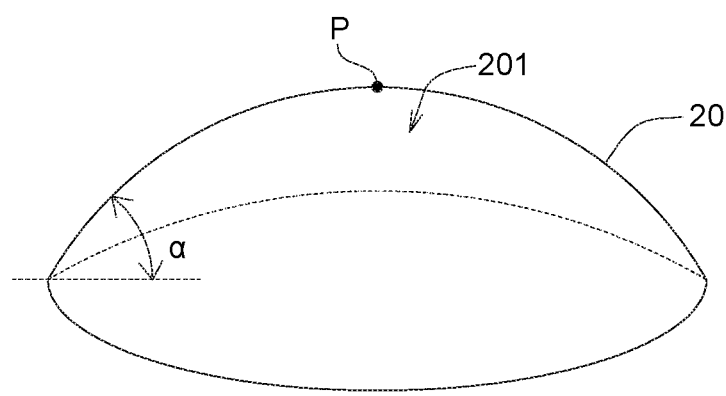
FIG. 2B is a schematic diagram of one protrusion of FIG. 1.

FIG. 1 is a schematic diagram of a part of an optical plate according to an embodiment of the present disclosure. FIG. 2A is a cross-sectional view of a protrusion along a cross-sectional line 2-2 of FIG. 1. FIG. 2B is a schematic diagram of one protrusion 20 of FIG. 1. Referring to FIG. 1 and FIG. 2A, in an embodiment, the optical plate 1 includes a main body 10 and several protrusions 20 formed on and projected from a first surface 101 of the main body 10. The protrusions 20 have a pitch Dp in a range of 0.5~10 mm. Within the pitch range of 0.5~10 mm, the optical plate can maintain high luminance and avoid the first surface 101 being scratched during the process of delivery or assembly. In an example, the protrusions 20 have a pitch Dp in a range of 0.5~9 mm. In another example, the pitch Dp is in a range of 0.5~8 mm. The portion of the first surface 101 other than the protrusions 20 is a smooth surface. In an example, the portion of the first surface 101 other than the protrusions 20 has a first center line mean roughness Ra in a range of 0.01~0.1 µm. When the first center line mean roughness Ra is in the range of 0.01~0.1 µm, the diffuser plate can provide better average luminance uniformity of four corners. In an example, the first center line mean roughness Ra of the first surface 101 is not over 0.08 µm, that is, the first center line mean roughness Ra is approximately equivalent to 0.08 µm or less than 0.08 µm. In another example, the ten-point mean roughness Rz of the first surface 101 is in a range of 0.1~1 µm, such as 0.5~1 µm. In an example, the main body 10 and the protrusions 20 are integrally formed in one piece.

In an embodiment, the protrusions 20 have a maximum height Hp between the protrusion peak P and the first surface 101 is in a range of 10~35 µm, such as 12~30 µm or 15~27 µm. In an example, the maximum height Hp of the protrusions 20 is approximately equivalent to (but is not limited to)

19.32 µm. In another example, the maximum height Hp of the protrusions 20 is approximately equivalent to (but is not limited to) 16.46 µm. Let one single protrusion 20 be taken for example. The outer diameter Dm of the protrusion 20 is defined as the maximum diameter of the bottom surface of the protrusion by which the protrusion 20 contacts the first surface 101 of the main body 10. The pitch Dp of the protrusions 20 is defined as a sum of the outer diameter Dm of one of the protrusions plus the shortest distance Ds between two adjacent protrusions 20, and can be expressed as: Dp=Dm+Ds. In an embodiment, the bottom surface of the protrusion by which the protrusion 20 contacts the first surface 101 is substantially a circle whose outer diameter Dm is in a range of 200~500 µm, such as 250~450 µm or 270~400 µm. In an example, the outer diameter of the protrusion 20 is approximately equivalent to (but is not limited to) 310.51 µm.

In an embodiment, the ratio Hp/Dm of the maximum height Hp to the outer diameter Dm of the protrusion 20 is in a range of 0.01~0.2, such as 0.01~0.18 or 0.02~0.175. In an example, the ratio Hp/Dm of the protrusions 20 is approximately equivalent to (but is not limited to) 0.062. In another example, the ratio Hp/Dm of the protrusions 20 is approximately equivalent to (but is not limited to) 0.053

In an embodiment, a tilt angle α is formed between the surface of a protrusion 20 and the first surface 101 of the main body 10. As indicated in FIG. 2A, a tilt angle α in a range of 2~10°, such as 2.5~9° or 3~7.5°, is formed between the outmost edge of the bottom of the protrusion 20 and the protrusion peak P. In an example, the tilt angle of the protrusion 20 is approximately equivalent to (but is not limited to) 5.2°.

In an embodiment, the protruded surface 201 of the protrusion 20 is a curved surface. As indicated in FIG. 1, the protrusion 20 is a bump whose shape could be a certain part of a sphere. In an embodiment, the protrusion 20 has a curved surface whose projection on the first surface 101 has a circular shape. The protrusion 20 has a curved surface whose radius of curvature is in a range of 300~1000 µm, such as 400~900 µm or 450 to 850 µm. In an example, the protrusion 20 has a radius of curvature approximately equivalent to (but is not limited to) 640 µm.

As indicated in FIG. 2B, the protrusion 20 of the present embodiment is a part of a sphere, and the projection of the protrusion 20 on the first surface 101 (not illustrated in FIG. 2B) has a circular shape. The protruded surface 201 includes a curved surface whose top is a protrusion peak P. The tilt angle α is an acute angle formed between the protrusion peak P and the first surface 101. However, in the present disclosure, the protrusion 20 is not limited to a part of a sphere, and can have other geometric shapes exemplified in FIGS. 3A~7B.

Figure 3A:
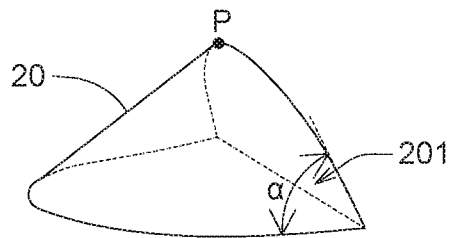
FIGS. 3A to 3D are schematic diagrams of examples of the protruded surface being a curved surface.
Figure 3B:
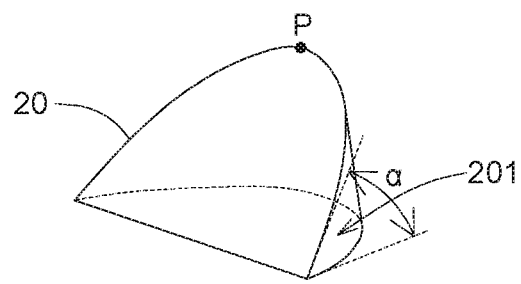
Figure 3C:
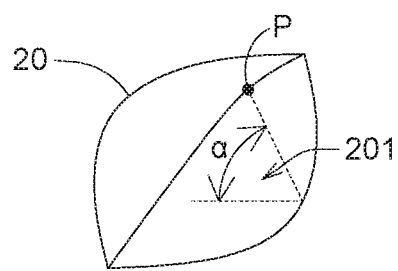
Figure 3D:
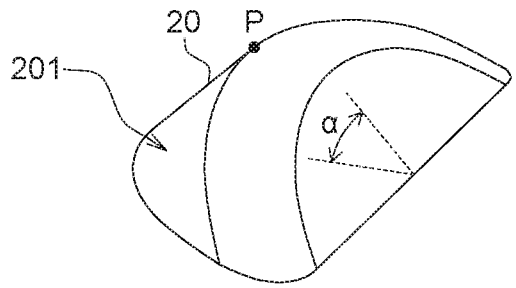

FIGS. 3A~3D are schematic diagrams of examples of the protruded surface 201 being a curved surface. As indicated in FIGS. 3A~3B, the projection of the protrusion 20 on the first surface 101 (not illustrated in FIGS. 3A~3B) has an arced shape. The protruded surface includes a curved surface and a bevel jointed to the curved surface. The apex of the junction between the curved surface and the bevel is the protrusion peak P. The tilt angle α is an acute angle formed between the bevel and the first surface 101. FIGS. 3C~3D are schematic diagrams of two curved being connected with each other. As shown in FIG. 3C, the protruded surface 201 incudci includes two curved surface which are connected with each other, wherein the highest point in the junction is the protrusion peak P. The tilt angle α is included between the protrusion peak P and the first surface 101. FIG. 3D further illustrates an exemplification of the bevel in addition to the junction between two curved surfaces. For example, FIG. 3D includes three surfaces in total, and the tilt angle α of FIG. 3D is an angle formed between the bevel and the first surface 101.

In an embodiment, the protrusion 20 includes a curved surface, and the tilt angle α is an angle formed between the protrusion peak P and the first surface 101. In another embodiment, the protrusion 20 includes a bevel, and the tilt angle α is an angle formed between the bevel and the first surface 101.

Figure 4A:
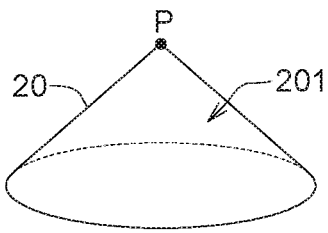
FIGS. 4A to 4C are schematic diagrams of examples of each protrusion being a conic bump.
Figure 4B:
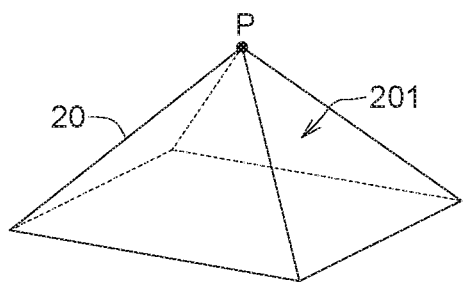
Figure 4C:
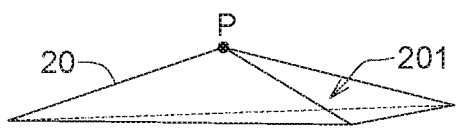

In an embodiment as indicated in FIGS. 4A~4C, the protrusion 20 is a conic bump, and the protrusion peak P is at the tip of the cone. Referring to FIG. 4A. The projection of the protrusion 20 on the first surface 101 has a circular shape, and the protruded surface 201 is a curved surface. Referring to FIG. 4B and FIG. 4C, the projection of the protrusion 20 on the first surface 101 can have a polygonal shape, such as a quadrilateral (a square or a rectangle) as indicated in FIG. 4B or a triangle as indicated in FIG. 4C. In an embodiment as indicated in FIGS. 4B~4C, the protruded surface 201 is formed of several bevels in the shape of a pyramid or a triangular cone, the tilt angle α is an angle formed between the bevel, which forms the protruded surface 201, and the first surface 101. In another embodiment, the protruded surface 201 can be formed of several curved surfaces, and the tilt angle α is formed between the protrusion peak P and the first surface 101.

In an embodiment, the projection of the protrusion 20 on the first surface 101 of the main body 10 is a regular shape formed by the bottom of the protrusion 20 by which the protrusion 20 contacts the first surface 101 of the main body 10. The regular shape is such as a circle, a square, a triangle or 13T other polygon as indicated in FIGS. 4A~4C, and the ratio of the area of the regular shape to the square of its perimeter (area/perimeter) is in a range of 0.03~0.08, such as 0.039 (triangle) to 0.0796 (circle).

Figure 5A:
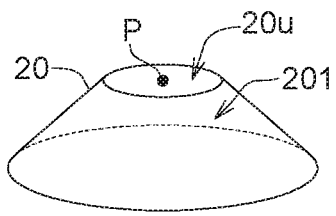
FIGS. 5A to 5C are schematic diagrams of examples of each protrusion having a top surface.
Figure 5B:
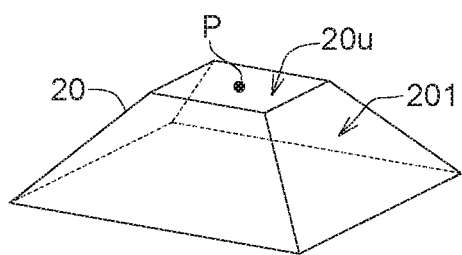
Figure 5C:
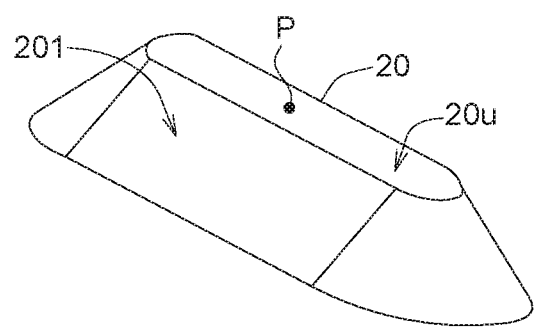

In an embodiment as indicated in FIGS. 5A~5C, the protrusion 20 is a protruded platform having a top surface 20u. The top surface 20u is a plane, and the protrusion peak P is any point on the top surface.

Figure 6A:
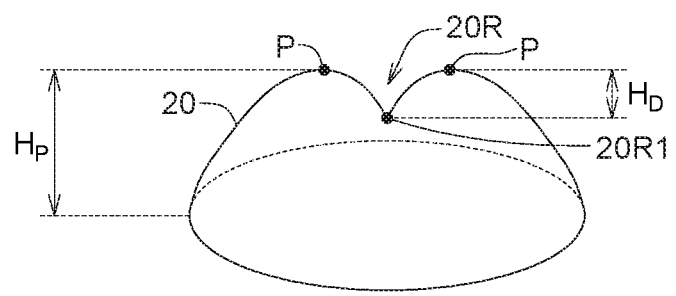
FIGS. 6A to 6K are schematic diagrams of examples of each protrusion having a concavity portion.
Figure 6B:
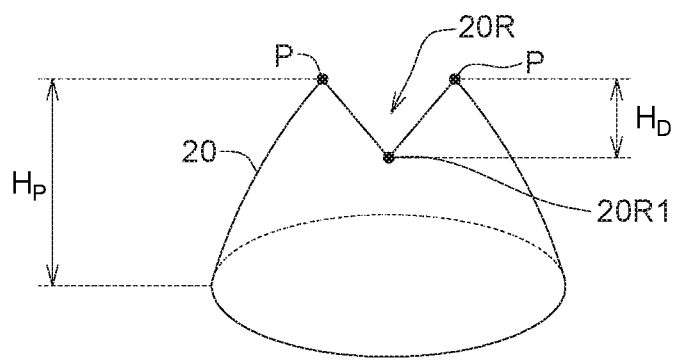
Figure 6C:
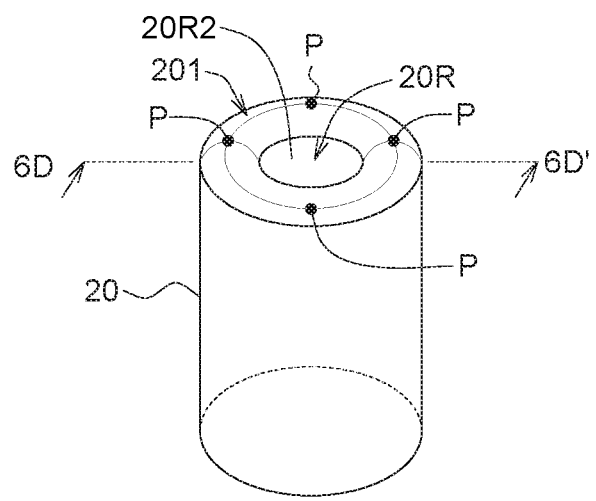
Figures 6D, 6E:
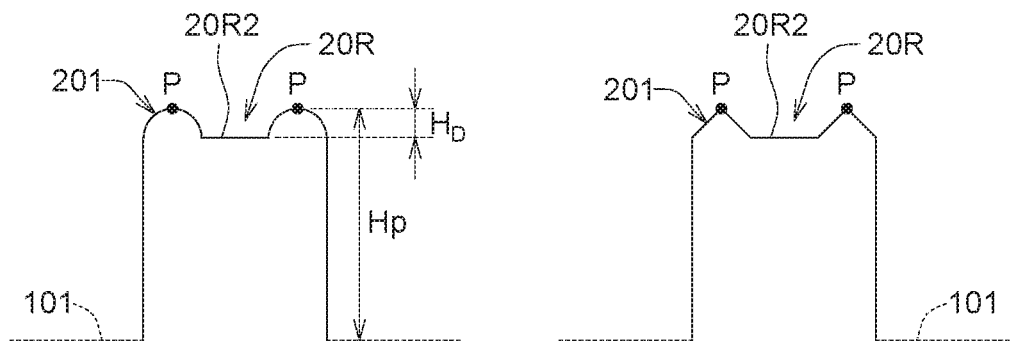
Figure 6F:
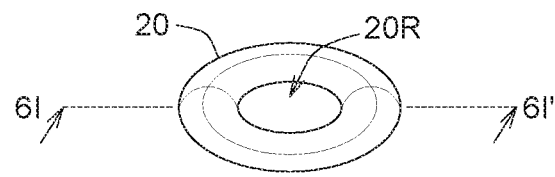
Figure 6G:
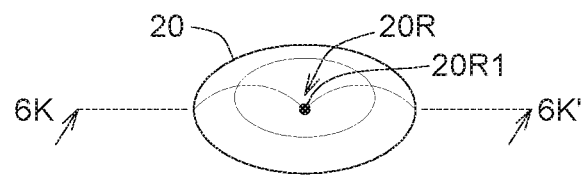
Figure 6H:
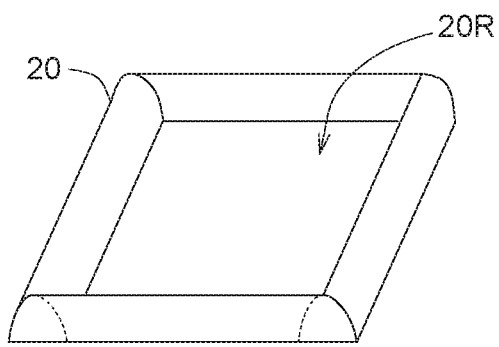
Figure 6I:
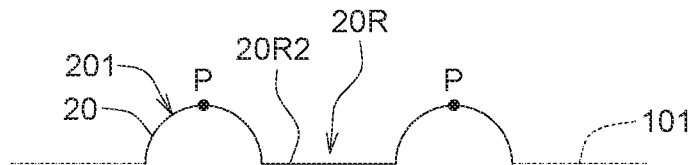
Figure 6J:
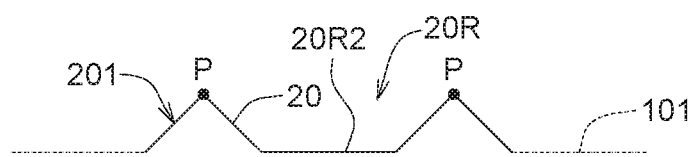
Figure 6K:
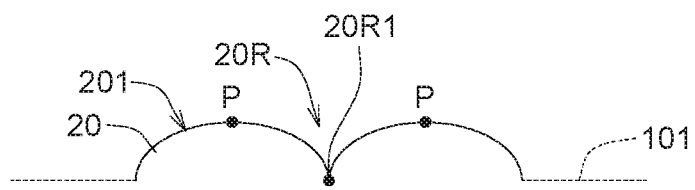

In an embodiment, the protrusion 20 includes a concavity portion 20R formed at the center position of the protrusion 20. The concavity portion 20R can be regarded as being indented downward from the top of the protrusion 20. The bottom of the concavity portion 20R is a pit 20R1 or a plane 20R2, and the peaks P are formed surrounding the concavity portion 20R, that is, the concavity portion 20R is formed between at least two peaks P. As indicated in FIGS. 6A~6B, the protrusion 20 has a concavity portion 20R1 between two peaks P, and the distance from the peak P to the pit 20R1 is the indented depth $H_D$ of the protrusion 20. In an embodiment, the percentage of the ratio $H_D$/Hp of the indented depth $H_D$ to the maximum height Hp of the protrusion 20 is in a range of 15~100%, such as 30~100% or 50~90%. As indicated in FIG. 6C, the bottom of the concavity portion 20R is a plane 20R2 surrounded by several protrusion peaks P. In the present embodiment, the protrusion peaks P are arranged as a ring structure. In an embodiment as indicated in FIG. 6C, the plane 20R2 is protruded with respect to the first surface 101 of the main body 10 (the first surface 101 is not illustrated in FIG. 6C). In another embodiment, the plane 20R2 can be coplanar with the first surface 101. Referring to FIG. 6D, a cross-sectional view along the cross-sectional line 6D-6D' of FIG. 6C is shown. In the present embodiment, the protruded surface is a curved surface, the protrusion peak P falls at the apex of the curved surface, the ring-structured has several protrusion peaks P arranged as a ring structure, and the plane 20R2 is protruded with respect to the first surface 101 of the main body 10. Referring to FIG. 6E, another cross-sectional view along the cross-sectional line 6D-6D' of FIG. 6C is shown. FIG. 6E is different from FIG. 6D in that the protruded surface 201 of FIG. 6E is a bevel. In an embodiment, the concavity portion can be jointed to the first surface 101 (illustrated in dotted lines in FIG. 6D), such that the protrusion 20 can form a ring structure. That is, the plane 20R2 of the concavity portion 20R is coplanar with the first surface 101, and the indented depth $H_D$ is identical to the maximum height Hp. Referring to FIGS. 6F~6H, schematic diagrams of the concavity portion 20R being jointed to or coplanar with the first surface 101 (not illustrated in FIG. 6F~6H) are shown. In an embodiment as indicated in FIG. 6F and FIG. 6G, the protrusion 20 is a circular ring. In another embodiment, the protrusion 20 is a polygonal ring, such as a four-corner ring as indicated in FIG. 6H. Referring to FIG. 6I, a cross-sectional view along the cross-sectional line 6I-6I' of FIG. 6F is shown. In the present embodiment, the protruded surface is a curved surface, the protrusion peak P is the apex of the curved surface, so that, the ring-structured protrusion has several protrusion peaks P arranged as a ring structure. Referring to FIG. 6J, another cross-sectional view along the cross-sectional line 6I-6I' of FIG. 6F is shown. FIG. 6J is different form FIG. 6I in that the protruded surface 201 of FIG. 6J is a bevel. Referring to FIG. 6K, another cross-sectional view along the cross-sectional line 6K-6K' of FIG. 6G is shown. In the present embodiment, the pit 20R1 of the concavity portion 20R is jointed to the first surface 101.

Figure 7A:
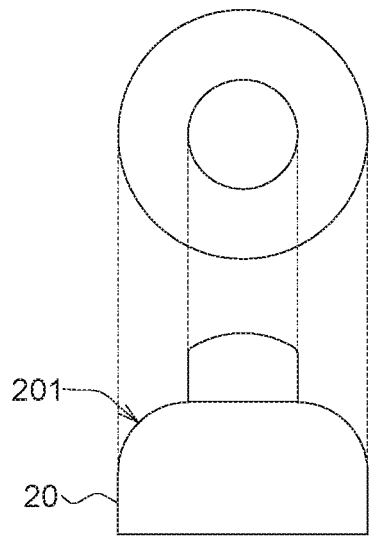
FIGS. 7A to 7B are schematic diagrams of each protrusion having a stepped structure.
Figure 7B:
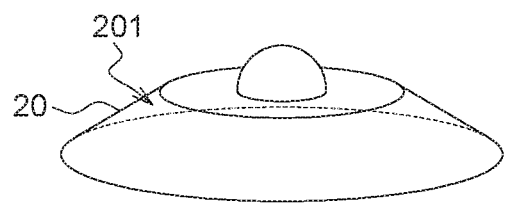

In an embodiment, the protrusion 20 can have a stepped structure (in the shape of "") as indicated in FIGS. 7A and 7B. The stepped structure can be integrally formed in one piece or formed by stacking two structures having different sizes, such as the structures of FIG. 5A~5C and FIG. 2B.

In an embodiment, the protruded surface 201 of the protrusion 20 is a smooth surface, such as a curved smooth surface. However, the size, the tilt angle and the radius of curvature of the protrusion 20 can be adjusted according to the needs in actual application and are not limited to the above exemplifications, the present disclosure does not impose extra restrictions. In an example, the size, the tilt angle and the radius of curvature are substantially the same for each protrusion 20 having a regular shape. Although the size, the tilt angle and the radius of curvature may vary slightly due to the change in the manufacturing process, they are regarded as features of the present disclosure as long as they are within the scope of protection of the present disclosure.

The thickness of the optical plate 1 is equivalent to the thickness Hm of the main body 10 plus the height Hp of the protrusion 20. When the optical plate 1 of the present disclosure is applied to a backlight module (BLM) as a diffuser plate, the thickness of the optical plate 1 is preferably in a range of 0.5 to 6 mm. If the thickness of the optical plate 1 is larger than 6 mm, a display apparatus equipped with a BLM having such optical plate may be too heavy to meet the requirements of the current displays pursuing light and thin. If the thickness of the optical plate is less than 0.5 mm, the optical plate may suffer from the insufficient rigidity, and has adverse effect on the result of diffusion. In one embodiment, a thickness of the optical plate 1 is in a range of 0.6 mm to 5 mm (i.e. 600 μm-5000 μm). In another embodiment, a thickness of the optical plate 1 is in a range of 0.8 mm to 3 mm. In another embodiment, a thickness of the optical plate 1 is in a range of 0.8 mm to 2.5 mm. The thickness of the optical plate 1 (mathematically equal to the thickness Hm of the main body 10 plus the thickness Hp of the protrusions 20) could be regarded as to be equal to the thickness Hm of the main body 10 since the thickness Hp of the protrusions 20 is much smaller than the thickness Hm of the main body 10.

Figure 8:
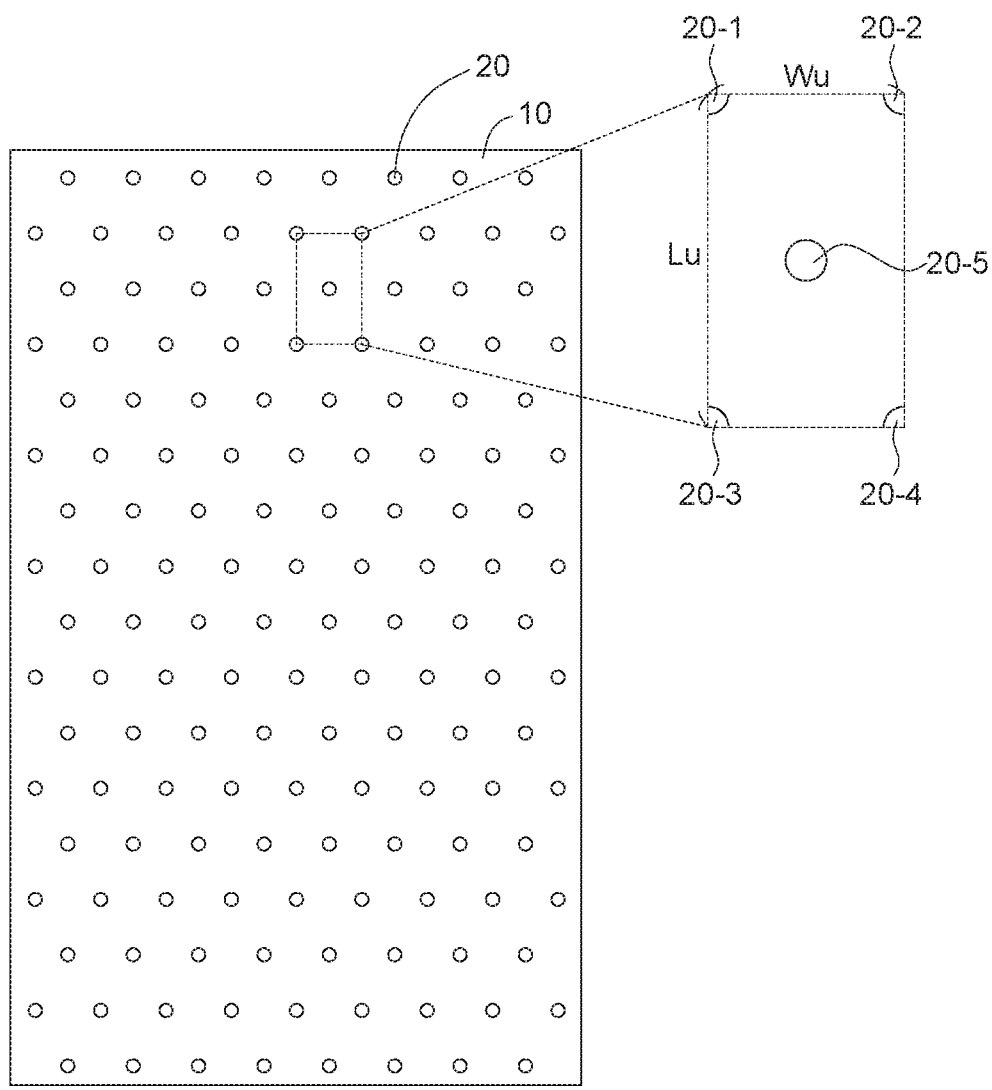
FIG. 8 is a schematic diagram of several protrusions distributed over a main body of an optical plate according to an embodiment of the present disclosure.

FIG. 8 is a schematic diagram of several protrusions distributed over a main body of an optical plate according to an embodiment of the present disclosure. In an embodiment, several protrusions 20 are uniformly (regularly) distributed on the first surface 101 of the main body 10. As indicated in FIG. 3, the protrusions 20 are alternated between upper and lower rows. A partial enlargement as indicated in FIG. 8 can be regarded as a repeat unit of the protrusions 20. The repeat unit includes 4 quarter-protrusions 20-1, 20-2, 20-3, and 20-4 at the four corners and 1 protrusion 20-5 at the center, that is, 2 protrusions 20 in total. The arrangement of the protrusions of the single repeat unit is similar to the face-centered cubic arrangement of a lattice. In an embodiment, the ratio of the regularly arranged protrusions to all protrusions is over 90%, such as 95%. That is, the repeat unit has a repeat ratio over 90%.

In an embodiment, an area ratio of the protrusions 20 to the first surface 101 of the main body 10 is in a range of 0.03~35%, such as 0.07~32%. In an example, the ratio of one of the protrusions 20 to the first surface 101 of the main body 10 is approximately equivalent to (but not limited to) 0.3%. In another example, the ratio of one of the protrusions 20 to the first surface 101 of the main body 10 is approximately equivalent to (but is not limited to) 1.21%. In another example, the ratio of one of the protrusions 20 to the first surface 101 of the main body 10 is approximately equivalent to (but is not limited to) 4.83%. The ratio of the protrusions 20 to the first surface 101 of the main body 10 can be calculated through the distribution as indicated in FIG. 8. For example, the area ratio of the protrusions (also referred as the distribution density of the protrusions) to the first surface can be calculated according to the area ratio of 2 protrusions 20 to 1 repeat unit.

Let the outer diameter Dm of one single protrusion be 310 μm (the radius is approximately equivalent to 155 μm), and the pitch Dp between the protrusions 20 be 5000 μm (that is, 5 mm). Then, the area of 1 repeat unit is: $2 \times 5000^2$, the area of one single protrusion is: $\pi \times 155^2 = 75477$ μm$^2$ and the area ratio of the protrusions to the first surface is: $(2 \times 75477) \div (2 \times 5000^2) = 0.30\%$.

Let the outer diameter Dm of one single protrusion be 310 μm (the radius is approximately equivalent to 155 μm), and the pitch Dp between the protrusions 20 be 2500 μm (that is, 2.5 mm). Then, the area of a repeat unit is: $2 \times 2500^2$ and the ratio of the protrusions is: $(2 \times 75477) \div (2 \times 2500^2) = 1.21\%$.

Let the outer diameter Dm of one single protrusion be 310 μm (the radius is approximately equivalent to 155 μm), and the pitch Dp between the protrusions 20 be 1250 μm (that is, 1.25 mm), then the area of a repeat unit is: $2 \times 2500^2$, and the ratio of the protrusions is: $(2 \times 75477) \div (2 \times 1250^2) = 4.83\%$.

In an embodiment, an area ratio of the first surface 101 other than the protrusions 20 to the first surface 101 is in a range of 65~99.97%, such as 68~99.93%.

In comparison to the microstructure of an existing diffuser plate, the protrusions 20 of the present disclosure have a larger size, and the pitch of the protrusions is in a range of 0.5~10 mm (that is, 500~10000 μm). For example, the outer diameter Dm (the largest characteristic dimension of the bottom surface is diameter) of one single protrusion 20 is in a range of 200~500 micrometers (μm). The size of one single microstructure of the existing diffuser plate is in a range of a few micrometers~30 μm, and the size of the pitch is under a few micrometers to 300 μm. Therefore, in comparison to the microstructure of the existing diffuser plate which has smaller size and denser distribution, the protrusions 20 of the optical plate of the embodiment have larger size and looser distribution. With the protrusions 20 having larger size and looser distribution and control roughness of the first surface 101, the reflectivity of the light can be increased and the uniformity of luminance can therefore be improved. Under such design, even when the protrusions 20 have regular arrangement as indicated in FIG. 1, the optical plate of the present embodiment when used as a diffuser plate in the backlight module still can reduce or even avoid the generation of moiré interference fringes.

According to the embodiments of the present disclosure, the upper surface and the lower surface of the main body 10 of the optical plate 1 have different levels of roughness. In an embodiment, while the first surface 101 of the main body 10 is a smooth surface, the second surface 102 opposite to the first surface 101 of the main body 10 can be a rough surface. That is, the roughness of the second surface of the second surface 102 is larger than the roughness of the first surface 101 other than the protrusions 20. In an example, the second center line mean roughness Ra is in a range of 3~7 μm. In an example, the ten-point mean roughness Rz of the second surface 102 is in a range of 20~35 μm. When the optical plate 1 is used in a backlight module, the first surface 101 is a light incident surface, and the second surface 102 is a light exiting surface; or the second surface 102 is a light incident surface, and the first surface 101 is a light exiting surface.

In an embodiment, the optical plate 1 can be formed of a transmissive material, such as a light transmissive resin with several diffusion particles being added and dispersed therein. Examples of the light transmissive resin include polycarbonate, polystyrene (PS), polymethylmethacrylate (PMMA), methyl methacrylate-styrene (MS), acrylonitrile-styrene (AS), cyclo-olefin copolymer, polyolefin copolymer (such as poly-4-methyl-1-pentene), polyethylene terephthalate, polyester, polyethylene, polypropylene, polyvinyl chloride, and ionomer. Preferably, the light transmissive resin is formed of polycarbonate, polystyrene, polymethyl methacrylate, or methyl methacrylate-styrene. In an embodiment, the optical plate 1 further comprises a plurality of diffusion particles dispersing in the main body 10 and the protrusions 20, for being the optical diffusing agent (ODA). For example, the light transmissive particles can be added into the main body 10 and the protrusions 20 as the diffusion particles. In an embodiment, the light transmissive resin is a resin whose flexural modulus is larger than 1 GPa, such as larger than 2 GPa. This type of resin provides better supportiveness and generates a smaller deformation in response to an external force. Therefore, the optical plate 1 formed of this type of resin is particularly suitable to be used in the backlight module, and can provide sufficient supportiveness without an excessive increase in thickness.

In an embodiment, the light transmissive resin has a mean average molecular weight in a range of 150000~450000, and can possess excellent mechanical properties and processability within the said range. In another embodiment, when the softening point temperature of the light transmissive resin (that is, 50° C./hr, 1 kg) is controlled to a range of 95~150° C., the light transmissive resin can also have excellent processability.

In an embodiment, the methanol soluble fraction (the sum of the oligomer, the additive, and the residual monomer that is soluble in methanol) is under 1.5 weight % of the light transmissive resin. Thus, the heat resistance of the light transmissive resin can be assured.

In the embodiment, examples of the light transmissive particles include the inorganic particles such as glass particles, and the organic particles such as polystyrene resins, methacrylate resins and silicon resins. Preferably, the organic particles are selected as the light transmissive particles. Also, the cross-linked organic particles are more preferred. It is preferable that the organic particles are at least partially cross-linked during the manufacture, thereby maintaining the particle form in the light transmissive resin processing. Accordingly, it is preferable to choose the organic particles which are still not melted in the light transmissive resin at the forming temperature of the light transmissive resin, and the cross-linked methacrylate resins and the cross-linked silicon resins are more preferred. In one embodiment, the suitable examples of the light transmissive particles include the polymer particles comprising partially cross-linked methacrylate resins as the base material and the structure having an inner core of poly(acrylic acid butyl ester) and an outer shell of poly(methyl methacrylate); in another embodiment, the polymer particles are formed as the core/shell structures wherein the core and shell comprise rubbery polyethylene (made by Rohm and Hass Company, trade name: Paraloid EXL-5136]. In one embodiment, the polymer particles comprise the silicon resin, such as a cross-linked siloxane (silicon-oxygen) [made by TOSHIBA Silicone Limited Corporation, trade name: Tospearl 120].

In one embodiment, an average particle size of the diffusion particles added into the optical plate 1 is in a range of 0.1 μm to 30 μm. In another embodiment, an average particle size of the diffusion particles added into the optical plate 1 is in a range of 0.01 μm to 20 μm. In another embodiment, an average particle size of the diffusion particles added into the optical plate 1 is in a range of 0.01 μm to 15 μm. It would be preferable for one embodiment that the diffusion particles are not projected from the surface of the main body 10 and/or the surfaces of the protrusions 20. In an embodiment, the diffusion particles are composed of inorganic particles and organic particles. For example, the diffusion particles are composed of titanium dioxide microparticles whose particle diameter is in a range of 0.01~0.05 μm and silicone resin microparticles whose particle diameter is in a range of 1 to 10 μm. Moreover, an optical plate 1 of one embodiment has a light transmittance ranged from 45% to 70%, such as 50% to 65%. When the light transmittance of the optical plate 1 is in a range of 45~70%, higher luminance can be achieved, and the problem of the light source being viewable can be avoided.

Additionally, the average particle size of the light transmissive particles (added as the diffusion particles) can be obtained by measuring the weight-average particle size using particle counter method, and the particle size can be analyzed using a particle number/particle distribution analyzer MODEL Zm (Nikkaki Bios Co., Ltd). When the weight average particle diameter is in a range of 0.01~30 μm, a sufficient light diffusivity can be obtained and the light emitting surface can have an excellent luminescence. Thus, when the additive amount is effectively controlled, the light diffusivity and the light transmittance will be improved.

Besides, the usage amount of the transparent particles being 0.1~20 parts by weight is based on the light transmissive resin being 100 parts by weight, and the usage amount being 0.35~12.5 parts by weight is particularly suitable. In an embodiment, 0.05 to 1 part by weight of titanium dioxide microparticles and 0.3 to 1.5 parts by weight of silicone resin are added to the transparent particles. When the usage amount of the transparent particles is less than 0.1 part by weight, the light diffusivity will be insufficient, and the problem of the light source being viewable will occur. On the other hand, when the usage amount of the transparent particles is over 20 parts by weight, the light transmittance will decrease, and the luminance will become worse.

In one embodiment, an optical plate 1 can be made by using the transmissive polystyrene (PS) resin (such as GPPS PG-383D, made by CHI MEI Corporation, the weight average molecular weight is about 300000, and the softening point temperature is 106° C.) with addition of the light transmissive particles (acting as diffusion particles as described above, such as: 0.05 to 1 part by the weight of titanium dioxide microparticles whose average particle diameter is in a range of 0.01~0.055 μm and 0.3~1.5 parts by the weight of silicone resin microparticles whose average particle diameter is in a range of 1~10 μm). Any suitable methods and apparatus which are capable of manufacturing a single-layered plate (i.e. the optical plate 1) can be adopted. In the embodiment, the single-layered plate can be manufactured by melt extrusion to form a plate-shaped structure with a predetermined thickness. During melt extrusion, the polymer mixture typically begins to soften in the melting zone of the extruder, and the melt is pressed out under a certain pressure. It is suggested that the pressure of the melting zone should be dropped to 1.33 kPa to 66.5 kPa before pressing out the melt. If the pressure of the melting zone is not decreased before pressing out the melt, oxygen may have effect on the light transmissive particles, especially the acrylic polymer particles, and causes the damage to the surfaces of the particles and thereby deteriorating the light diffusion property. Besides melt extrusion, other known methods, such as injection molding, injection compression molding, blow molding, compression molding, powder injection molding, are all applicable for forming the optical plate 1.

Additionally, the optical plate 1 is not limited to a single-layered plate, and can be a multi-layered plate. For example, the optical plate 1 may further include a coating on the optical resin layer. In one embodiment, a thickness of the coating is in a range of 0.01 mm to 0.5 mm, such as in a range of 0.02 mm to 0.4 mm or in a range of 0.03 mm to 0.3 mm. If the thickness of the coating is over 0.5 mm, a display apparatus equipped with a BLM having such v plate may be too thick to meet the requirements of the current displays pursuing light and thin. The coating on the optical resin layer may have high transparency and the lenticular effect. The coating can be made from the material selected from one or combination of acrylic resin, polymethylmethacrylate (PMMA), methyl methacrylate-styrene copolymers (MS copolymers), and acrylonitrile-styrene copolymers (AS copolymers). Preferably, the coating can be made from polymethylmethacrylate (PMMA) and methyl methacrylate-styrene copolymers (MS copolymers). Additionally, one or more ultraviolet light absorbers can be selectively added into the composition of the optical 1, for improving the resistance to weathering and light fastness (known as "weathering resistance" or "weather fastness") and also the harmful ultraviolet light. Additionally, one or more fluorescent agents can be selectively added into the composition of the optical plate 1, for absorbing ultraviolet light and re-emitting light to the visible region.

In an embodied optical plate 1 with multi-layered structure, the amount of the ultraviolet light absorber optionally added is in a range of 0.5 wt % to 15 wt % by the weight of the coating of acrylic resin, wherein the light transmissive particles having an average particle size ranged from 0.01 μm to 30 μm can be the optionally added with the amount of 0.1 wt % to 20 wt % by the weight of the coating of acrylic resin; preferably, 0.5 wt % to 12 wt % by the weight of the coating of acrylic resin. Also the fluorescent agent can be the optionally added with the amount of 0.001 wt % to 0.1 wt % by the weight of the coating of acrylic resin. In one embodiment, examples of the ultraviolet light absorber are presented as follows: benzophenone ultraviolet light absorbers such as 2,2'-Dihydroxy-4-methoxybenzophenone, triazine ultraviolet light absorbers such as 2-(4,6-diphenyl-1,3, 5-triazine-2-substituent)-5-hydroxycyclohexyl phenol, benzotriazole ultraviolet light absorbers such as 2-(2H-benzotriazole-2-substituent)-4-methylphenol, 2-(2H-benzotriazole-2-substituent)-4-tert-octylphenol, 2-(2H-benzotriazole-2-substituent)-4,6-bis(1-methyl-1-phenylethyl) phenol, 2-(2H-benzotriazole-2-substituent)-4,6-bis-tert-pentylphenol, 2-(5-chloro-2H-benzotriazole-2-substituent)-4-methyl-6-tert-butylphenol, 2-(5-chloro-2H-benzotriazole-2-substituent)-2,4-tert-butylphenol and 2,2'-methylene-bis [6-(2H-benzotriazole-2-substituent)-4-(1,1,3,3-tetramethylbutyl)phenol].

In one embodiment, preferably examples of the ultraviolet light absorber are presented as follows: 2-(2-hydroxy-5-methylphenyl) benzotriazole, 2-(2-hydroxy-5-tert-octylphenol)benzotriazole, 2-(2-hydroxy-3,5-diisopropylbenzene) phenylbenzotriazole, 2-(2-hydroxy-3-tert-butyl-5-methylphenyl)-5-chlorobenzotriazole, 2,2'-methylene-bis[4-(1,1,3,3-tetramethylbutyl)-6-(2H-benzotriazole-2-substituent)phenol], 2-[2-hydroxy-3-(3,4,5,6-tetrahydro phthalic succinimide methy)-5-methylphenyl]benzotriazole. Preferably, 2-(2-hydroxy-5-tert-octylphenol)benzotriazole (made by Ciba-Geigy CORPORATION, trade name: Tinuvin 329) and 2,2'-methylene-bis[4-(1,1,3,3-tetramethyl-butyl)-6-(2H-benzotriazole-2-substituent)phenol] are selected.

Moreover, the foregoing ultraviolet light absorbers can be used alone or in combinations of two or more. Also, the ultraviolet light absorber added is preferably in a range of 0.5 wt % to 15 wt % by the weight of the coating of acrylic resin, and more preferably in a range of 1 wt % to 10 wt %. If the adding amount of the ultraviolet light absorber is less than 0.5 wt %, it would cause poor weathering resistance (i.e. weather fastness) and large variation in the hue of resin. If the adding amount of the ultraviolet light absorber is more than 15 wt %, it would deteriorate the tone of the resin and the luminance of light.

Also, the fluorescent agent (for absorbing ultraviolet light and re-emitting light to the visible region) optionally added in the embodiment can change the tone of the resin without deteriorating the resistance to light, such as forming a white resin or a blue white resin. Material examples of such fluorescent agents include diphenylethylene-base compounds, benzimidazole-base compounds, benzoxazole-base compounds, phthalimide-base compounds, rhodamine-base compounds, coumarin-base compounds, oxazole-base compounds etc. In one embodiment, the fluorescent agent can be the optionally added with the amount of 0.001 wt % to 0.1 wt % by the weight of the coating of acrylic resin, and preferably in a range of 0.002 wt % to 0.08 wt %. In the compositions of the embodiments, the fluorescent agent can be optionally added in the foregoing range for improving the tone and the luminance of light.

Figure 9:
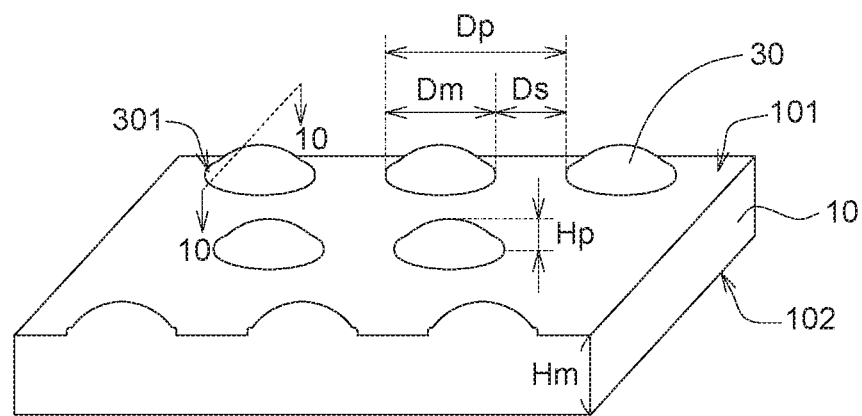
FIG. 9 is a schematic diagram of a part of an optical plate of another embodiment of the present disclosure.
Figure 10:
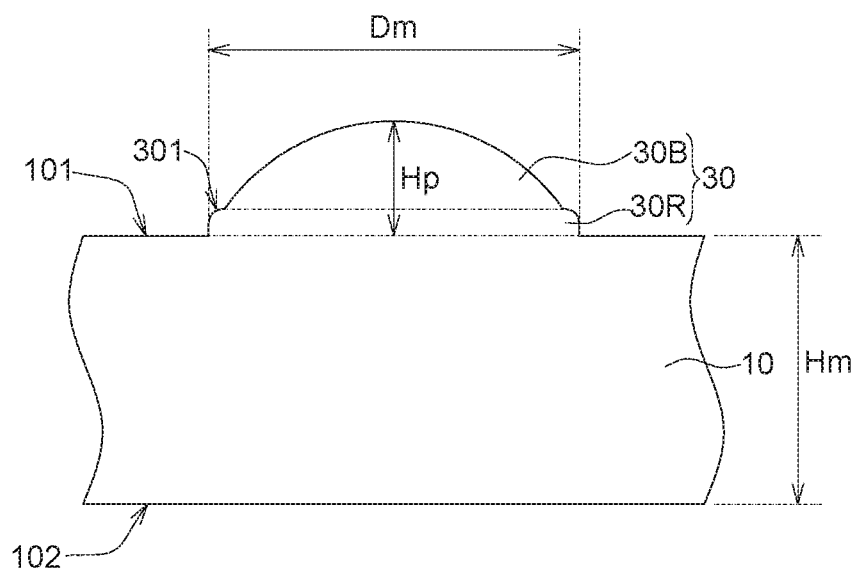
FIG. 10 is a cross-sectional view of a protrusion along a cross-sectional line 10-10 of FIG. 9.

An embodiment of the present disclosure is described above with accompanying drawings FIG. 1 and FIG. 2A, but the present disclosure is not limited thereto. FIG. 9 is a schematic diagram of a part of an optical plate of another embodiment of the present disclosure. FIG. 10 is a cross-sectional view of another protrusion along a cross-sectional line 10-10 of FIG. 9. For the elements of FIGS. 9~10 that are identical or similar to the elements of FIGS. 1~2A, the same or similar designations are used. As indicated in FIG. 9, the optical plate 1' also includes a main body 10 and several protrusions 30 formed the first surface 101 of the main body 10 and projected from the first surface 101. In the present embodiment, descriptions related to the pitch Dp, the maximum height Hp and the tilt angle α of the protrusions 30 as well as the roughness of the first surface 101 and the second surface 102 can be obtained with reference to above descriptions, and the similarities are not repeated here. The protrusions 30 of the present embodiment are different from the protrusions 20 of FIGS. 1 and 2A in that each protrusion 30 includes a bump 30B and a bottom ring 30R formed below the bump 30B. As indicated in FIGS. 9~10, the outer edge 301 of the bottom ring 30R surrounds and connects the bump 30B, and the outer edge 301 is protrudingly formed on the first surface 101. In a practical fabrication, the bottom ring 30R and bump 30B are integrally formed in one piece with the main body 10. With the protrusions 20 of FIGS. 1 and 2A and the protrusions 30 of FIGS. 9~10, the light emitting area of the display device can maintain high luminance and the uniformity of luminance can be increased.

Relevant Experiment

A number of relevant experiments and experimental data are listed below and used for describing the embodiments of the present disclosure. Descriptions of the structure of the optical plate 1 can be obtained with reference to the above disclosure and FIGS. 1 to 10. In the experiments, a number of samples are provided, and the specifications of each sample are as follows:

Comparative Example 1: a commercially available single-sided texture diffuser plate DS551A (made by CHI MEI Corporation, Taiwan), wherein the surface of the texture diffuser plate has a center line mean roughness Ra in a range of 3~7 μm, and the thickness of the texture diffuser plate is 1.5 mm.

Comparative Example 2: a diffuser plate having several irregular islands protruded from the surface of the main body of the substrate, wherein the width of the longest platform on the top surface of the irregular islands is in a range of 0.388 to 2.315 mm, the height of each island is 23.02 μm, the distance between adjacent islands is in a range of 21~433 μm, and the thickness of each island is 1.5 mm.

Examples 1~3: the optical plate of FIGS. 1 and 2A. Relevant parameters are listed in Table 1.

Luminance, and Average Luminance Uniformity of Four Corners (%):

Luminance measurement is conducted by a BM-7A luminance colorimeter (TOPCON CORPORATION, Japan). The optical plates of Examples 1-3 and Comparative Examples 1-2 are disposed on a light module with LEDs array for luminance measurement. Luminance is a standardized value, obtained by dividing a central luminance value of one of Examples 1-3 by the central luminance value of a commercially available diffuser plate DS601A of Chimei Corporation (as 100%). The average luminance uniformity of four corners is acquired by: dividing each of the luminance values obtained in four corners of the module by the central luminance value of the module, and then calculating an average of those four values.

Roughness:

Roughness measurement is conducted by a Surface Roughness Tester (model: SJ-210) of the Mitutoyo Company. Roughness Ra and Rz of the first surface other than the protrusions and roughness Ra and Rz of the second surface other than the protrusions are measured at an interval of 5 mm.

The outer diameter, the height, the tilt angle, the pitch of the protrusions:

Randomly sampled and measured by using the laser scanning confocal microscope (model: VK-X100 Series) of the Keyence Corporation.

The above results of measurement are recorded and listed in Table 1. However, the values listed in Table 1 are for exemplary purpose only, and the scope of each parameter of the embodiments of the present disclosure is not limited thereto.

TABLE 1

|  | Comparative Example 1 | Comparative Example 2 | Example 1 | Example 2 | Example 3 |
|---|---|---|---|---|---|
| Optical plate thickness (mm) | 1.5 | 1.5 | 1.5 | 1.5 | 1.5 |
| Protrusion outer diameter (μm) | — | 388~2315 | 310.51 | 310.51 | 310.51 |
| Protrusion height (μm) | — | 23.02 | 19.32 | 16.46 | 18.89 |
| Ratio of height to outer diameter | — | 0.001~0.059 | 0.062 | 0.053 | 0.061 |
| Protrusion tilt angle (°) | — | 7.89 | 5.2 | 5.2 | 5.2 |
| Protrusion bottom area (μm$^2$) | — | — | 75477 | 75477 | 75477 |
| Ratio of area to circumstance$^2$ | — | 0.0012 | 0.0796 | 0.0796 | 0.0796 |
| Protrusion pitch (mm) | — | — | 5 | 2.5 | 1.25 |
| Area ratio of protrusions to the surface (distribution density) | — | 51.79% | 0.30% | 1.21% | 4.83% |
| First surface center line mean roughness (μm) | 3~7 | 0.04 | 0.06 | 0.08 | 0.08 |
| First surface ten-point mean roughness (μm) | 20~35 | — | 0.61 | 0.71 | 0.67 |
| Second surface center line mean roughness (μm) | 3~7 | 3~7 | 3~7 | 3~7 | 3~7 |
| Second surface ten-point mean roughness (μm) | 20~35 | 20~35 | 25~35 | 25~35 | 25~35 |
| flexural modulus (Gpa) | 2.5 | 2.5 | 2.5 | 2.5 | 2.5 |
| Average Luminance Uniformity of Four Corners (%) | 53.2 | 53.5 | 54.6 | 55.5 | 55.6 |
| 60° Gloss | 9.35 | 59.35 | 94 | 97.85 | 98.51 |

As indicted in Table 1, the average luminance uniformity of four corners of Examples 1~3 is superior to that of Comparative Examples 1~2 due to the features of the optical plate that the area ratio of the protrusions to the first surface of the main body is in a range of 0.03~35% and that the portion of the first surface 101 other than the protrusions 20 has a first center line mean roughness Ra in a range of 0.01~0.1 μm. That is, the structure of the protrusions of Examples 1~3 enables the optical plate to have better performance in terms of uniformity.

As indicted in Table 1, 60° gloss of Examples 1~3 is superior to that of comparison examples 1~2 due to the features of the optical plate that the area ratio of the protrusions to the first surface of the main body is in a range of 0.03~35% and that the portion of the first surface 101 other than the protrusions 20 has a first center line mean roughness Ra in a range of 0.01~0.1 μm. That is, the structure of the protrusions of Examples 1~3 increases the reflectivity for the side light and therefore enables the optical plate to have better performance in terms of uniformity.

Figure 11A:
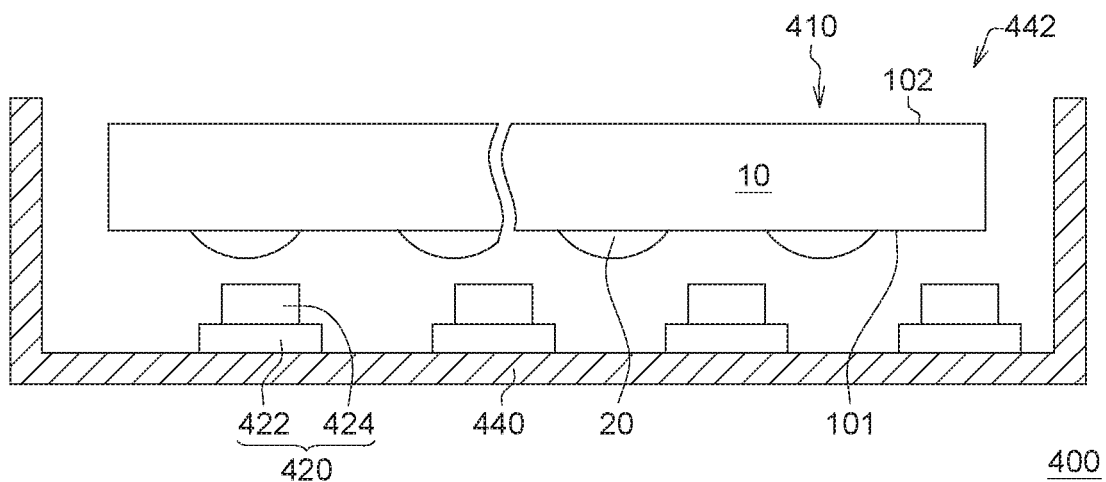
FIG. 11A is a schematic diagram of a backlight module using the optical plate of an embodiment of the present disclosure.

Referring to FIG. 11A, a schematic diagram of a backlight module using the optical plate of an embodiment of the present disclosure is shown. The backlight module 400 of the present embodiment can be realized by a direct type backlight module adaptable to a flat display module. The backlight module 400 includes a diffuser plate 410, at least one light source 420 (several light sources are illustrated in FIG. 11A) and a frame 440. The frame defines an accommodating space 442, in which the diffuser plate 410 and the light source 420 are disposed. The diffuser plate 410 is disposed above the light source 420. The diffuser plate 410, such as the optical plate of any of the above embodiments, includes a main body 10 having a first surface 101 and several protrusions 20 formed on and projected from the first surface 101. As indicated in FIG. 11A, the light source 420 and the first surface 101 are opposite to each other. In this case, due to the center line mean roughness Ra of the first surface 101 of the diffuser plate 410 is in a range of 0.01 μm to 0.1 μm, and the 60° gloss is greater than 90. Thus, light emitted from the light source 420 which is incident to the first surface 101 of the diffuser plate 410 at a high angle (oblique incidence) can be efficiently reflected toward four corner directions of the diffuser plate 410, that is, the diffuser plate 410 has a high uniformity of four corners, so that the backlight module can have high uniformity of luminance.

In an application example, the light source 420 includes a substrate 422 and a light emitting unit 424. The light emitting unit 424, which can be realized by a light emitting diode (LED) element or other light emitting element, is disposed on the substrate 422. The light emitted from the light emitting unit 424 enters the diffuser plate 410 and then is exited via second surface 102 of the diffuser plate 410 to form a surface light source having high uniformity of luminance.

Figure 11B:
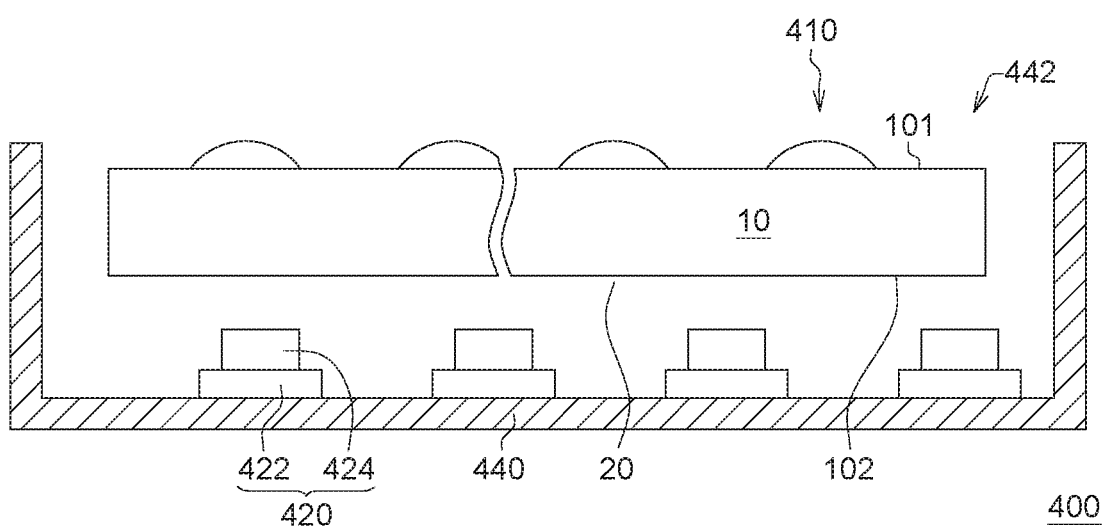
FIG. 11B is a schematic diagram of another backlight module using the optical plate of an embodiment of the present disclosure.

FIG. 11B is a schematic diagram of another backlight module using the optical plate of an embodiment of the present disclosure. FIG. 11B is different from FIG. 11A in that the main body 10 of the optical plate of FIG. 11B has a rougher surface (that is, the second surface 102), such as a texture surface, facing the light source of the backlight module 400. Such arrangement also belongs to an application of the present disclosure. In the present embedment, other optical film or optical plate can be adhered to the protrusions by an adhesive layer to improve the overall optical performance of the backlight module.

Figure 12A:
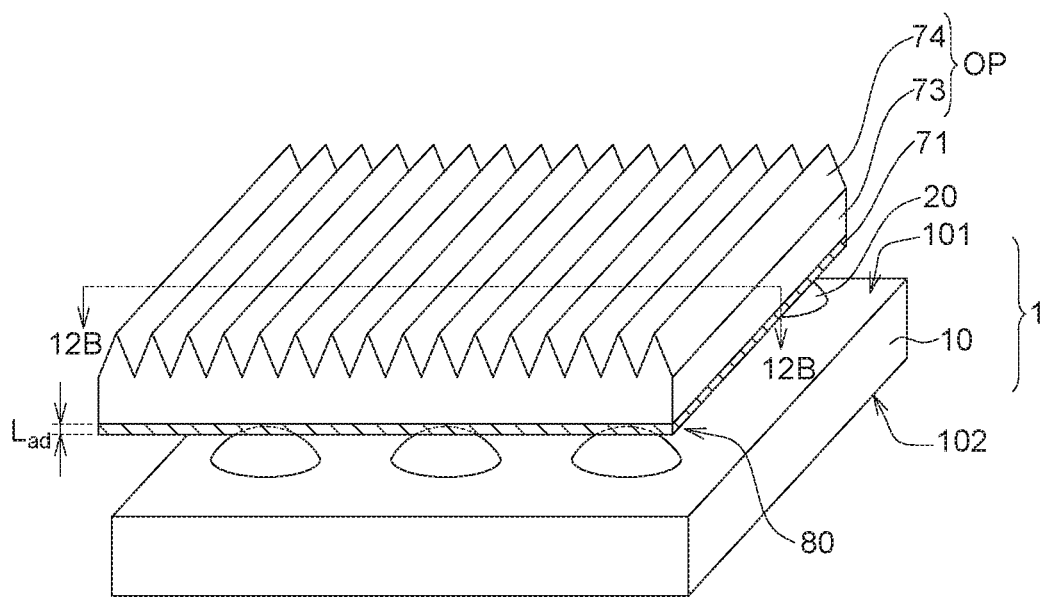
FIG. 12A is a schematic diagram of an optical film bonded with the optical plate of an embodiment of the present disclosure.
Figure 12B:
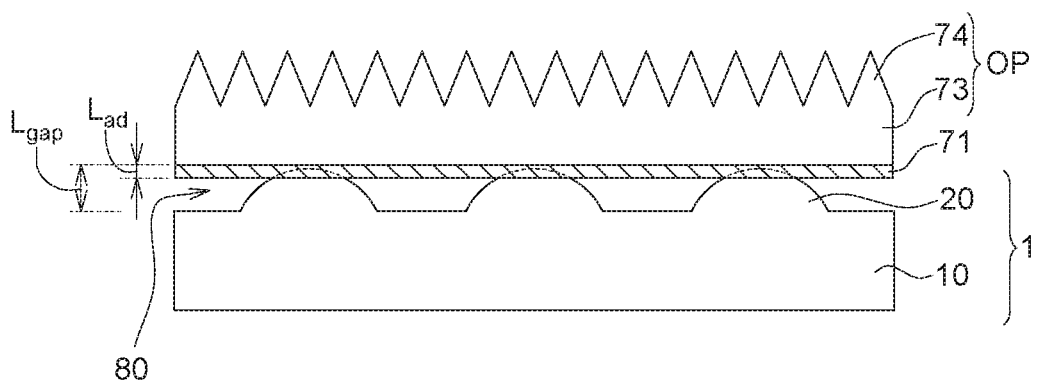
FIG. 12B is a cross-sectional view of the optical plate and the optical film along a cross-sectional line 12B-12B of FIG. 12A.

In the embodiment, the adhesive layer is, for example, a pressure sensitive adhesive, such as acrylic, polyurethane, rubber or siloxane, etc. FIG. 12A is a schematic diagram of an optical film bonded with the optical plate of an embodiment of the present disclosure. FIG. 12B is a cross-sectional view of the optical plate and the optical film along a cross-sectional line 12B-12B of FIG. 12A. Refer to FIGS. 12A and 12B simultaneously.

In an example, the optical plate 1 of the present embodiment is bonded with an optical film OP by using an adhesive layer 71, wherein the optical film OP is disposed above the first surface 101 of the main body 10, and the adhesive layer 71 is interposed between the optical plate 1 and the optical film OP and adheres to the top surface of the protrusions 20 of the optical plate 1. As indicated in FIG. 12B, the adhesive layer 71 has a thickness $L_{ad}$, a gap $L_{gap}$ is formed between the optical film OP and the first surface 101, and the top surface of the protrusions 20 of the optical plate 1 is recessed to the adhesive layer 71 and supports the optical film OP. That is, the adhesive layer 71 does not directly contact the first surface 101, therefore an air layer 80 is formed between the first surface 101 of the main body 10 and the adhesive layer 71. In an example, the thickness $L_{ad}$ of the adhesive layer 71 is in a range of 3~7 μm, the gap $L_{gap}$ between the bottom of the optical film OP and the first surface 101 is in a range of 10 to 42 μm. Moreover, the air layer 80 of the present embodiment is uniformly formed between the optical plate 1 and the adhesive layer 71. The height from the first surface 101 of the main body 10 to the bottom surface of the adhesive layer 71 remains the same below the optical film OP. In comparison to the optical structure in which the adhesive layer 71 directly adheres and contacts the first surface 101, the air layer 80 allows the light to be refracted from the first surface at a larger angle, and therefore enhance the light diffusion effect.

In an embodiment when the thickness of the adhesive layer and the disposition of an air layer are taken into consideration, the maximum height Hp of the protrusion 20 should be in a range of 10~35 μm, such as 12~30 μm or 15~27, to assure that the air layer is uniformly formed between the optical plate 1 and the adhesive layer 71.

In an embodiment when the outer diameter Dm of the protrusion is in a range of 200~500 μm and the pitch between two adjacent protrusions is in a range of 0.5~10 mm, the optical film OP bonded to the optical plate can receive an excellent support effect, that is, the height from the first surface 101 to the bottom of the adhesive layer 71 can remain the same. In another embodiment when the ratio of protrusion area to the first surface is in a range of 0.03~35% and that the portion of the first surface 101 other than the protrusions 20 has a first center line mean roughness Ra in a range of 0.01~0.1 μm, the optical film OP can receive an excellent support effect and can provide an excellent diffusion effect in terms of average luminance uniformity of four corners.

In an embodiment, for the protrusion structure with protrusion peak P, such as the protrusion 20 of FIG. 2B, the protrusion of FIGS. 3A~4C, or the protrusion of FIGS. 6A~6C and 6F~6H, the protrusion peak P can be indented into the adhesive layer 71 to provide an anchoring effect which enhances the bonding force between the adhesive layer 71 and the protrusion.

Figure 12C:
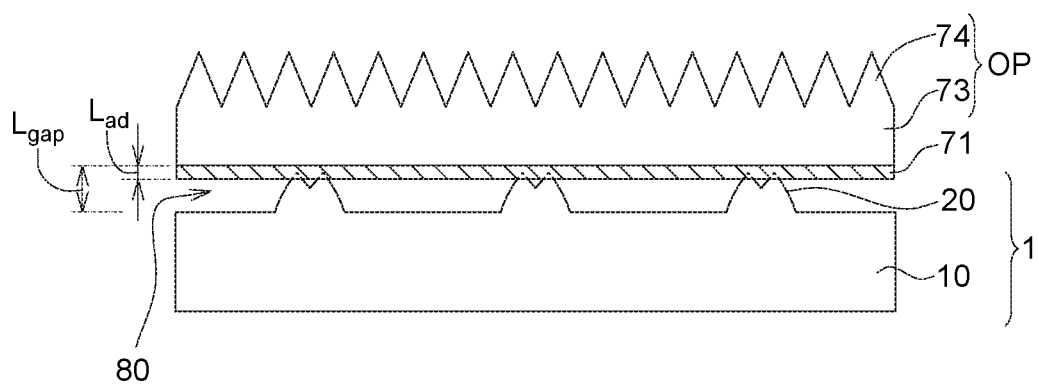
FIG. 12C is a cross-sectional view of the optical plate and optical film in another embodiment of the present disclosure.

In an embodiment as indicated in FIG. 12C, for the protrusion having an concavity portion 20R, such as the protrusion of FIGS. 6A~6C or 6F~6H (FIG. 12C is a schematic diagram of the protrusion of FIG. 6B), through the adjustment in the indented depth $H_D$ (illustrated in FIG. 6B) of the concavity portion 20R, the ratio of the air layer can be increased, such that the ratio $H_D$/Hp of the indented depth $H_D$ to the maximum height Hp (illustrated in FIG. 6B) is in a range of 15~100%, such as 30~100% or 50~90%. When the ratio $H_D$/Hp is in the range of 15~100%, after the optical film OP and the adhesive layer 71 are bonded, part of the concavity portion is not indented into the adhesive layer 71. Thus, the ratio of the air layer can be increased, the optical diffusion effect can be enhanced, and the overall optical performance can be improved.

Additionally, the optical film OP may include a multi-layered film formed of one or more than one diffusion film and one or more than one prism sheet or formed of a micro-lens film and one or more than one prism sheet for adjusting the exit angle of the light (such as focusing the light). Although FIGS. 12A and 12C are exemplified by that the optical film OP includes a diffusion film 73 and a prism sheet 74, the present disclosure does not limit the quantity of optical films, the prism structure, the quantity of layers, or the type of implementation.

In an embodiment, the backlight module 400 can be used in a display device, such as TV, notebook computer, mobile computer, or computer monitor. Or, the backlight module 400 can directly be used to provide illumination for a light box or a sign board.

To summarize, the optical plate disclosed in above embodiments has several protrusions formed on the main body surface. When the optical plate of the embodiments of the present disclosure (such as, FIGS. 1 and 9) is used as a diffuser plate, the diffuser plate of present disclosure performs better uniformity of luminance than existing diffuser plates. Therefore, the application of using the optical plate of the embodiments of the present disclosure as a diffuser plate not only enhances image display effect, avoids moiré interference fringes, but further reduces the quantity of functional films and the manufacturing cost. Furthermore, the display device having the optical plate of the embodiments of the present disclosure can be thinned further, and the optical plate of the embodiments of the present disclosure is particularly valuable to large-sized display device. Besides, when the optical plate of the embodiments of the present disclosure is used as a diffuser plate and the protrusions of the diffuser plate are bonded with an optical film through an adhesive, the protrusions can further support the optical film. Thus, an air layer can be formed between the surface of the main body of the optical plate and the adhesive layer, the overall light diffusion effect can be enhanced.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical plate, comprising:
   a main body having a first surface, wherein the first surface is a light incident surface opposite to a light exiting surface, wherein the light incident surface and the light exiting surface are main body surfaces of the optical plate; and
   a plurality of protrusions formed on and projected from the first surface, wherein an area ratio of the protrusions to the first surface of the main body is in a range of 0.3~4.83%, the protrusions have a pitch in a range of 1.25~5 mm, and a portion of the first surface other than the protrusions has a first center line mean roughness Ra in a range of 0.01~0.1 µm, wherein one of the protrusions has an outer diameter in a range of 200~500 µm.

2. The optical plate according to claim 1, wherein the protrusions comprise a curved surface.

3. The optical plate according to claim 2, wherein a radius of curvature of the curved surface of each protrusion is in a range of 300~1000 µm.

4. The optical plate according to claim 1, wherein one of the protrusions comprises:
   a bump; and
   a bottom ring formed below the bump, wherein the bottom ring surrounds and connects the bump.

5. The optical plate according to claim 4, wherein the bottom ring, the bump and the main body are integrally formed in one piece.

6. The optical plate according to claim 1, wherein the main body further has a second surface having a second center line mean roughness larger than the first center line mean roughness, wherein the second surface is the light exiting surface.

7. The optical plate according to claim 6, wherein the second center line mean roughness Ra is in a range of 4~8 µm.

8. The optical plate according to claim 1, wherein one of the protrusions has maximum height in a range of 10 µm~35 µm.

9. The optical plate according to claim 1, wherein a ratio of a height to an outer diameter of the protrusions is in a range of 0.01~0.2.

10. The optical plate according to claim 1, wherein a tilt angle in a range of 2°-10° is formed between the outmost edge of a bottom and a protrusion peak of one of the protrusions.

11. The optical plate according to claim 1, wherein the protrusions have a concavity portion formed between at least two peaks of the protrusion.

12. The optical plate according to claim 1, wherein the optical plate is formed of a light transmissive resin having a flexural modulus larger than 1 GPa.

13. The optical plate according to claim 1, wherein the main body and the protrusions are integrally formed in one piece.

14. A backlight module, comprising:
   a light source; and
   the optical plate according to claim 1, wherein the first surface of the optical plate is disposed opposite to the light source.

15. A display device, comprising:
   the optical plate according to claim 1, wherein, the display device is selected from a group composed of television (TV), notebook computer, mobile computer, and computer monitor.

16. An optical structure, comprising:
   an optical plate, comprising:
      a main body having a first surface, wherein the first surface is a light exiting surface opposite to a light incident surface, wherein the light exiting surface and the light incident surface are main body surfaces of the optical plate; and
      a plurality of protrusions formed on and projected from the first surface, wherein an area ratio of the protrusions to the first surface of the main body is in a range of 0.3~4.83%, the protrusions have a pitch in a range of 1.25~5 mm, and a portion of the first surface other than the protrusions has a first center line mean roughness Ra in a range of 0.01~0.1 µm, wherein one of the protrusions has an outer diameter in a range of 200~500 μm;

an optical film disposed above the first surface of the main body; and an adhesive layer interposed between the optical plate and the optical film, wherein the adhesive layer adheres the top surface of the protrusions, and an air layer is formed between the first surface and the adhesive layer.

17. A backlight module, comprising:

a light source; and the optical structure according to claim 16, wherein a second surface of the optical plate is disposed opposite to the light source, and the second surface is the light incident surface.

18. An optical structure, comprising:

an optical plate, comprising:

a main body having a first surface, wherein the first surface is a light exiting surface opposite to a light incident surface, wherein the light exiting surface and the light incident surface are main body surfaces of the optical plate; and a plurality of protrusions projected from the first surface, wherein one of the protrusions has an outer diameter in a range of 200~500 μm and a maximum height (Hp) in a range of 10~35 μm, two adjacent protrusions have a pitch in a range of 1.25~5 mm, wherein an area ratio of the protrusions to the first surface of the main body is in a range of 0.3~4.83%;

an optical film disposed above the first surface of the main body; and an adhesive layer interposed between the optical plate and the optical film, wherein the adhesive layer adheres the top surface of the protrusions, and an air layer is formed between the first surface and the adhesive layer.

19. The optical structure according to claim 18, wherein, each protrusion has a concavity portion, and an air layer is formed between a bottom of the concavity portion and the adhesive layer.

* * * * *